I. S. CLOPE.
PROCESS FOR EXTRACTING FROM WOODS THEIR SOLUBLE CONTENTS.
APPLICATION FILED OCT. 22, 1913.
1,112,359.
Patented Sept. 29, 1914.
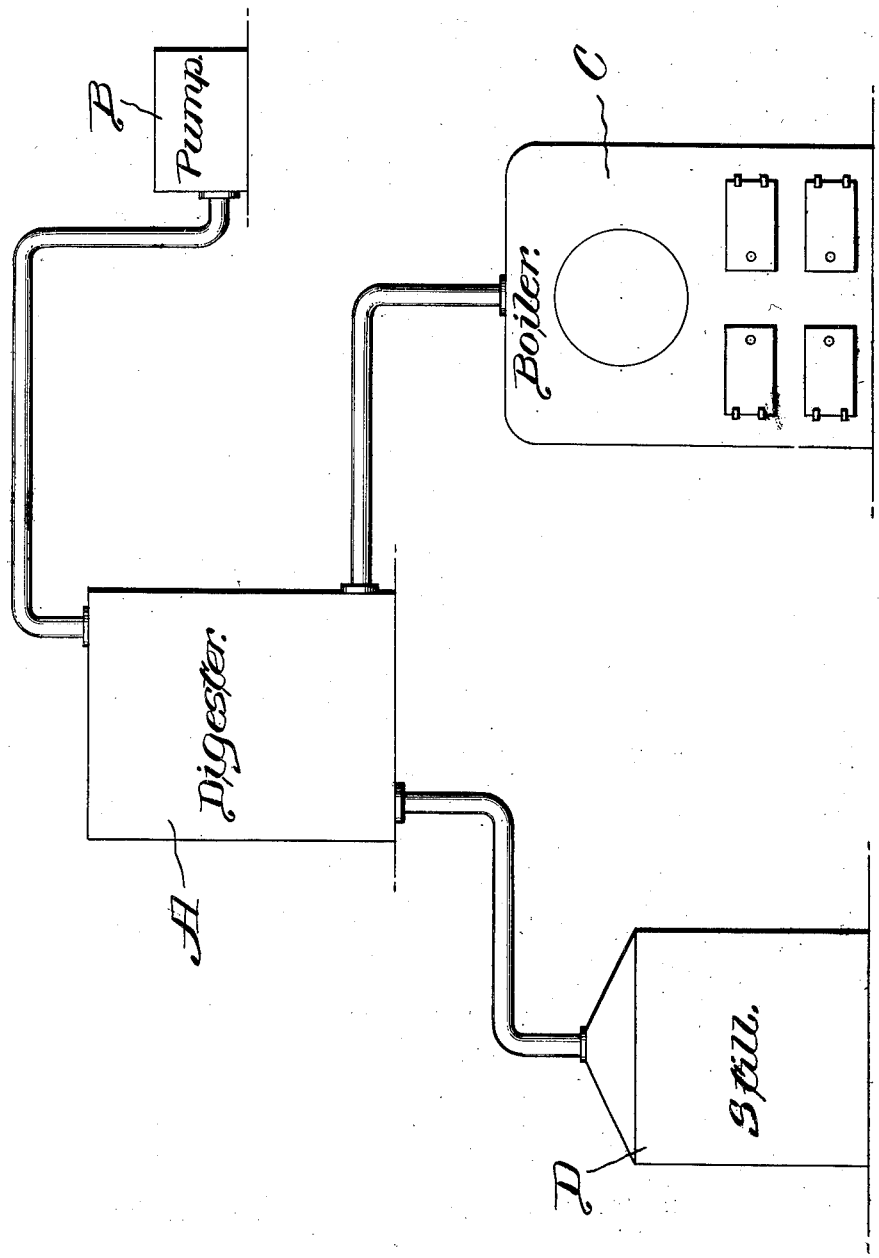
Witnesses
Edwin J Beller.
HW Preman
Inventor
Irving Spencer Clope.
by Wilkinson, Guista + Meekaye,
Attorneys

UNITED STATES PATENT OFFICE.

IRVING SPENCER CLOPE, OF WILKINSBURG, PENNSYLVANIA, ASSIGNOR TO EMPIRE CHEMICAL COMPANY, OF ATLANTA, GEORGIA, A CORPORATION OF GEORGIA.

PROCESS FOR EXTRACTING FROM WOODS THEIR SOLUBLE CONTENTS.

1,112,359.  Specification of Letters Patent.  Patented Sept. 29, 1914.

Application filed October 22, 1913. Serial No. 796,678.

*To all whom it may concern:*

Be it known that I, IRVING SPENCER CLOPE, a citizen of the United States, residing at Wilkinsburg, in the county of Allegheny and State of Pennsylvania, have invented certain new and useful Improvements in Processes for Extracting from Woods Their Soluble Contents; and I do hereby declare the following to be a full, clear, and exact description of the invention, such as will enable others skilled in the art to which it appertains to make and use the same.

I have invented and discovered certain new and useful improvements in processes of extracting from resin bearing woods their resinous and other constituents.

My invention contemplates the extraction, from woods, particularly from coniferous woods, of the rosin, pine oil, turpentine, wood alcohol, acetone and water, with perhaps other ingredients, by means of the haloid derivatives of acetylene, ethylene and ethane. I may use one or any number of these derivatives. The particular one of these which I have found most useful, generally, is trichlorethylene. This is a compound, liquid which, at a steam pressure of 25 pounds, that is a temperature of 112° C., has no deleterious effect upon any of the usual metals. It has a boiling point of about 88° C., and a specific gravity of 1.47. It does not decompose at its boiling point, and its vapor has a very low tension and is non-inflammable.

The resinous constituents of pine, and similar woods, are very valuable, in some instances being much more valuable than the complete wood structure. Rosin and turpentine are particularly important products in this connection. Their extraction from the associated ligneous tissue has been attempted in many ways by the use of solvents, and many of these solvents will remove the constituents aforesaid to a considerable extent. Particularly is this true of the hydrocarbons, such as naphtha. The extractive qualities of the hydrocarbon solvents, however, are such that the products, particularly the rosin, is not of the grade that the market demands, nor as good as that obtained by the ancient method of "boxing" the trees. This is probably due to the fact that the two acids which constitute the bulk of commercial rosin, namely abietic acid and colophonic acid, are not equally soluble in such solvents, and the hydrocarbon dissolves first the softer and more readily soluble one of these acids, leaving the harder and more brittle rosin constituent behind in the fibers of the wood, to some extent at least. A solvent of the class I use, and particularly trichlorethylene, seems to dissolve with equal readiness both the acids of the rosin, as well as the other constituents of the wood that I have mentioned.

After treatment, the fiber, that is the cellulose and lignose of the wood, is left behind practically clean, and may be turned over at once if desired, to the pulp maker, or may be used in any other way that is desired.

After extraction, the solvent liquid, together with the bodies dissolved therein, is subjected to fractional distillation, whereby the acetone and wood alcohol are separated first, then the solvent, then the turpentine and pine oil and water, leaving the rosin behind in the still in the form of a dense, clear and clean mass. The solvent is, of course, recovered and used again.

The accompanying drawing is a diagram of an apparatus that may be used in carrying out my process, and in which A represents a digester or vessel; B a pump for exhausting said digester or vessel; C a boiler in which the vapors of the solvent are generated and from which they pass to the digester or vessel; and D a still in which the solvent and dissolved woody constituents are subjected to fractional distillation.

In carrying out my process I charge a digester or vessel with chips or billets of the wood undergoing treatment. The digester or vessel may then be exhausted of air, the vapor from the boiling solvent is let into the digester; the chips being practically free from air, the solvent vapor immediately penetrates the pores and intercellular spaces of the wood, and the solvent action begins at once. The fact that this penetration has occurred induces the subsequent penetration of the extracting vapors. As the vapors condense, they trickle down to the bottom of the digester charged with the dissolved constituents of the wood, and this liquid may be continuously withdrawn, or withdrawn from time to time, into a receiver and led to a still for further treatment. Condensation of substances of the class to which mine belongs occurs readily, little heat being given off, so that it is not necessary to subject a charged digester to chilling influences during the extraction process. By this process of leading the solvent into the digester in the form of vapor and allowing it to condense among the chips it will be seen that the chips are at no time immersed in a liquid bath of the solvent and its dissolved extract, but that the chips are leached clean, as it were, of everything except the final charge of condensed solvent, in a manner well understood. However, instead of treatment with vapor *in vacuo*, the solvent may be used in the liquid form, the chips being either immersed therein, or the liquid solvent caused to flow through them. Or the treatment may be partly with the solvent in the liquid form, and partly with it in the form of vapor.

As I have indicated above, while my process is particularly intended for woods of coniferous genera, I do not desire or intend to be limited to the treatment of such woods, as the solvents of the group I have used, and particularly the particular solvent, trichlorethylene, is well adapted for the extraction of most of the constituents, except the cellulose and lignose of any wood.

Having thus described my invention what I claim and desire to secure by Letters Patent of the United States is:—

1. The process of extracting from coniferous woods, their soluble constituents, which consists in treating such woods with trichlorethylene.

2. The process of extracting from coniferous woods, acetone, wood alcohol, turpentine, pine oil and resin, which consists in treating such woods in a vacuum with vapors of trichlorethylene, allowing such vapors to condense, together with the dissolved constituents of the wood in such condensate, and subjecting the resulting solution thus formed to fractional distillation.

3. The process of extracting from coniferous woods, acetone, wood alcohol, turpentine, resin, and other soluble constituents, which consists in treating such woods with vapors of trichlorethylene, allowing such vapors to condense, together with the dissolved constituents of the wood and subjecting the resulting solution thus formed to fractional distillation.

In testimony whereof, I affix my signature, in presence of two witnesses.

IRVING SPENCER CLOPE.

Witnesses:
R. M. PARKER,
ERNEST WILLIAMS.